(12) United States Patent
Debiasi et al.

(10) Patent No.: US 7,959,839 B2
(45) Date of Patent: Jun. 14, 2011

(54) METHOD OF FORMING A COMPOSITE ARTICLE IN A MOLD

(75) Inventors: David Debiasi, Canton, MI (US); Jon P. Pavlinac, South Lyon, MI (US)

(73) Assignee: BASF SE, Ludwigshafen (DE)

( * ) Notice: Subject to any disclaimer, the term of this patent is extended or adjusted under 35 U.S.C. 154(b) by 3 days.

(21) Appl. No.: 12/296,375

(22) PCT Filed: Apr. 5, 2007

(86) PCT No.: PCT/US2007/008514
§ 371 (c)(1),
(2), (4) Date: Aug. 3, 2009

(87) PCT Pub. No.: WO2007/117555
PCT Pub. Date: Oct. 18, 2007

(65) Prior Publication Data
US 2009/0302509 A1    Dec. 10, 2009

Related U.S. Application Data

(60) Provisional application No. 60/790,043, filed on Apr. 7, 2006.

(51) Int. Cl.
*B29C 41/20* (2006.01)
*B29C 41/22* (2006.01)
*B29C 44/12* (2006.01)

(52) U.S. Cl. ....... 264/255; 264/247; 264/45.2; 264/511; 264/135; 264/309

(58) Field of Classification Search ........................ None
See application file for complete search history.

(56) References Cited

U.S. PATENT DOCUMENTS

| 3,108,850 | A | * | 10/1963 | Brandt | ........................ 264/509 |
| 3,504,063 | A | | 3/1970 | Lemelson | |
| 4,904,429 | A | | 2/1990 | Takahashi et al. | |
| 5,498,307 | A | | 3/1996 | Stevenson | |
| 5,573,848 | A | * | 11/1996 | Van Praet | ...................... 428/354 |
| 6,074,001 | A | | 6/2000 | Yates | |
| 6,248,441 | B1 | | 6/2001 | Anderson et al. | |
| 6,314,598 | B1 | | 11/2001 | Yates | |

(Continued)

OTHER PUBLICATIONS

PCT International Search Report for PCT/US07/08514, dated Jul. 16, 2008, 2 pages.

*Primary Examiner* — Edmund H. Lee
(74) *Attorney, Agent, or Firm* — Howard & Howard Attorneys PLLC

(57) ABSTRACT

A method of forming a composite article having a decal occurs in a mold. The mold includes a surface that defines a mold cavity. A decal is introduced to the surface of the mold. A polyurethane elastomer composition is applied into the mold cavity to form an elastomeric layer over the decal. The composite article including the elastomeric layer and the decal may then be demolded from the mold. Alternatively, a paint composition is applied into the mold cavity to form a paint layer over the decal. The polyurethane elastomer composition is applied into the mold cavity to form an elastomeric backing layer over the paint layer. The composite article including the paint layer, the decal, and the elastomeric backing layer may then be demolded from the mold. The composite article may be a seat for an all-terrain vehicle.

44 Claims, 3 Drawing Sheets

U.S. PATENT DOCUMENTS

| | | |
|---|---|---|
| 6,409,865 B1 | 6/2002 | Yates |
| 6,508,902 B2 | 1/2003 | Lind |
| 6,544,449 B1 | 4/2003 | Gardner |
| 6,620,371 B1 * | 9/2003 | Winget et al. ............ 264/513 |
| 6,726,969 B1 | 4/2004 | Balaji et al. |
| 6,773,653 B2 | 8/2004 | Miller et al. |
| 6,852,403 B2 | 2/2005 | Harrison et al. |
| 7,005,091 B2 | 2/2006 | Cowelchuk et al. |
| 2003/0067099 A1 | 4/2003 | Miller et al. |
| 2003/0180498 A1 * | 9/2003 | De Winter et al. ............ 428/67 |
| 2004/0194875 A1 * | 10/2004 | Lee ............ 156/230 |
| 2006/0284330 A1 | 12/2006 | De Winter et al. |

* cited by examiner

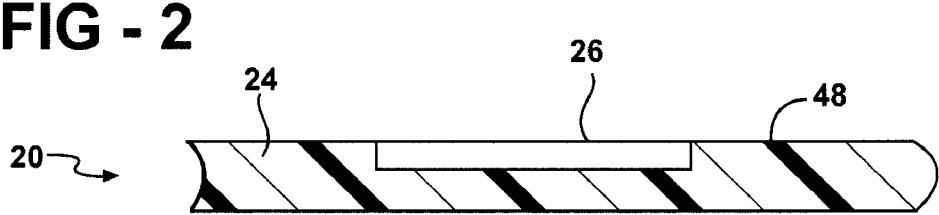
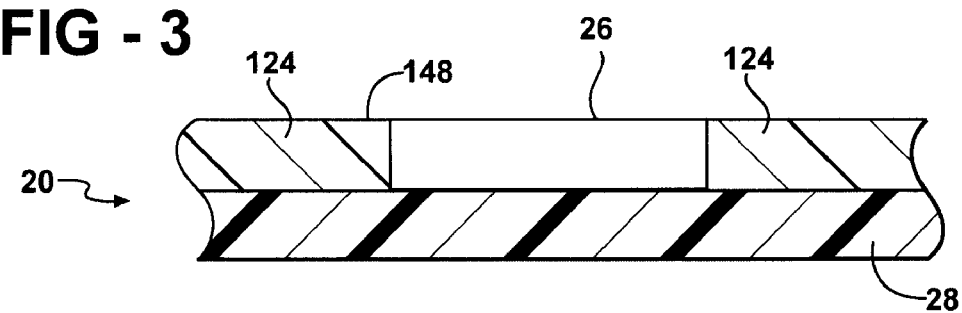
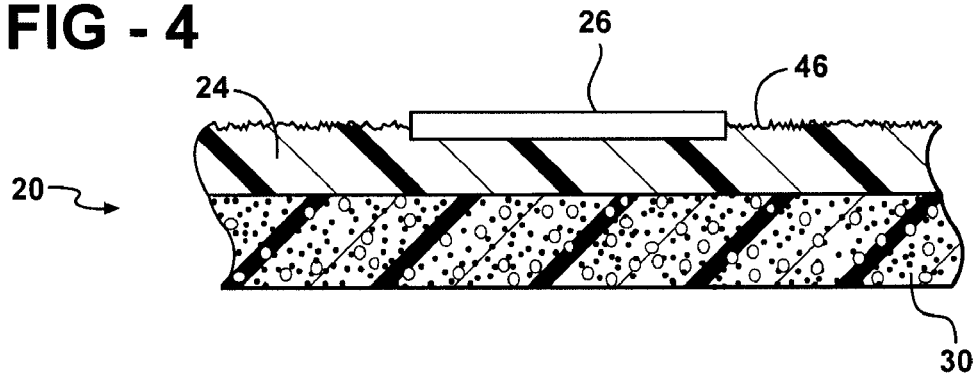
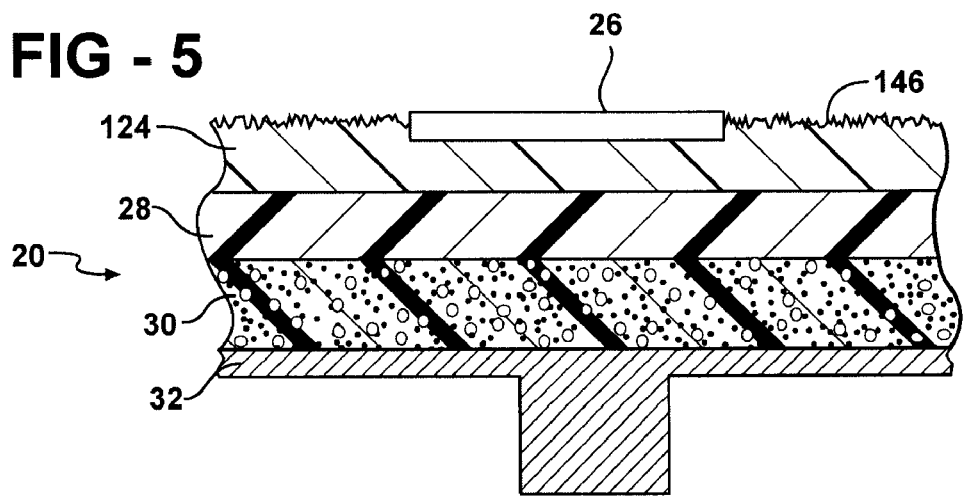

METHOD OF FORMING A COMPOSITE ARTICLE IN A MOLD

CROSS REFERENCE TO RELATED APPLICATION

This application claims priority to and all the advantages of International Patent Application No. PCT/US2007/008514, filed on Apr. 5, 2007, which claims priority to U.S. Provisional Patent Application Ser. No. 60/790,043 filed on Apr. 7, 2006

FIELD OF THE INVENTION

The present invention generally relates to a method of forming a composite article in a mold. More specifically, the present invention relates to a method of forming a composite article having a decal in a mold.

DESCRIPTION OF THE RELATED ART

In recent years, polyurethanes have been used in the automotive industry to form composite articles such as headrests, trim panels, seats, pillar trim panels, instrument panels, door panels, armrests, and other parts for a vehicle. Polyurethanes have also been used in other industries to form composite articles such as seats for all-terrain vehicles (ATVs), motorcycles, bicycles, agricultural vehicles, and turfgrass vehicles.

The composite articles often include a skin that provides an aesthetically pleasing covering. The skin commonly includes a relatively thin outer paint layer formed from a paint composition and a thicker polyurethane elastomeric backing layer formed from a polyurethane elastomer composition. The outer paint layer provides a desired color and UV degradation resistance quality of the composite article. The elastomeric backing layer provides a desired elastic tactile, strength, tear resistance, and water resistance quality of the composite article. The skin also presents a smooth, textured or grained pattern of the composite article.

U.S. Pat. No. 6,852,403 (the '403 patent) to Harrison et al. discloses a method of forming a composite article in a mold including a surface that defines a mold cavity. To form the composite article, a paint composition corresponding to a color of the composite article is sprayed into the mold cavity to form a paint layer. Next, a polyurethane elastomer composition is applied into the mold cavity to form an elastomeric backing layer. After the layers have cured, the composite article is then demolded from the mold.

It is often desirable to have a composite article that includes a decal. Typically, the decal presents a logo, a decorative, or an informative feature, such as text. For example, the skin of the composite article commonly includes the decal for providing brand recognition and distinction from other similar composite articles, or for providing instruction or warnings, e.g., "Caution—Always Wear a Helmet". The decal is placed onto the skin of the composite article after demolding the composite article from the mold. Typical methods of attaching the decal to the composite article include gluing the decal onto the composite article with an adhesive, painting the decal onto the composite article with a paint composition, or sewing the decal onto the composite article. Inevitably, the conventional methods of attaching the decal to the composite article add to the overall cost of the composite article by adding additional materials, labor, and defects, while simultaneously adding to the overall manufacturing time.

U.S. Pat. No. 6,773,653 (the '653 patent) to Miller et al. discloses a method of preparing a labeled article in a mold including a surface. The '653 patent discloses a label that includes a face stock sandwiched between a heat activatable adhesive layer and an adhesive layer. The label is introduced into the mold. In one embodiment of the method, a thermoplastic material is then heated and injected into the mold. The thermoplastic material contacts and bonds to the heat activatable adhesive layer of the label. In another embodiment, a hot molded article is brought into contact with the label. The hot molded article and the heat activatable adhesive layer then bond to form the labeled article. The labeled article is then cooled and demolded from the mold. The heat activatable adhesive activates at high temperatures ranging from 176° F. to 572° F. In all embodiments, the method of the '653 patent relies on the high temperatures to form the labeled article. However, due to the high temperatures, the heat activatable adhesives cannot be used for forming composite articles from polyurethane elastomer compositions without degrading or breaking down the polyurethane elastomer.

U.S. Pat. No. 5,498,307 (the '307 patent) to Stevenson et al. also discloses a method for labeling an article in a mold including a surface. A pattern structure formed from plastic is introduced to the surface of the mold. The mold is then charged with a thermoplastic material and the mold is heated such that the thermoplastic material forms into a shape of the article and bonds with the pattern structure. The article and the pattern structure are then cooled such that the pattern structure is an integral part of the article. However, as with the '653 patent, the '307 patent relies on excessively high temperatures, e.g., temperatures at or above the melting point of the thermoplastic material, in order to bond the pattern structure with the article.

Due to the deficiencies of the prior art, there is an opportunity to provide a method of forming a composite article in a mold using polyurethane elastomer compositions and a decal that is independent from high temperatures and from heat activatable adhesives.

SUMMARY OF THE INVENTION AND ADVANTAGES

The present invention provides a method of forming a composite article in a mold. The mold includes a surface that defines a mold cavity. For the method, a decal is introduced to the surface of the mold. A paint composition is applied into the mold cavity to form a paint layer. A polyurethane elastomer composition is applied into the mold cavity to form an elastomeric backing layer. The composite article is demolded from the mold.

The present invention provides a cost-effective and simple method of forming the composite article in the mold. The decal is sufficiently bonded within the composite article. The method is independent from the use of a heat and/or a solvent-activatable adhesive to bond the decal to the composite article. The paint composition applied into the mold cavity and onto the decal forms an interface between the decal and the composite article. When the paint composition at the interface cures to form the paint layer, the paint layer bonds the decal to the composite article. Alternatively, the polyurethane elastomer composition may form the interface and thereby cure to form the bond between the decal and the composite article. The bond formed between the decal and the composite article may be strengthened when the decal, the paint composition, and the polyurethane elastomer composition include polyurethane. In addition, the paint composition and the polyurethane elastomer composition may be applied and formed at ambient temperature. For example, the paint layer and the elastomeric backing layer may be applied and formed at room temperature, e.g., 68° F.

The decal is also easy to place by simply introducing the decal to the surface of the mold. The force of gravity may retain the decal on the surface of the mold. Optionally, vacuum may be applied through a hole in the surface to retain the decal adjacent the surface of the mold. The surface of the mold may also include a recess for retaining the decal on the surface of the mold. The recess may be adjusted such that the decal may present a raised portion of the composite article.

BRIEF DESCRIPTION OF THE DRAWINGS

Other advantages of the present invention will be readily appreciated, as the same becomes better understood by reference to the following detailed description when considered in connection with the accompanying drawings wherein:

FIG. 2 is a partial cross-sectional side view of one embodiment of the composite article of FIG. 1 taken along line A-A;

FIG. 3 is a partial cross-sectional side view of another embodiment of the composite article of FIG. 1 taken along line A-A;

FIG. 4 is a partial cross-sectional side view of another embodiment of the composite article of FIG. 1 taken along line A-A;

FIG. 5 is a partial cross-sectional side view of another embodiment of the composite article of FIG. 1 taken along line A-A;

DETAILED DESCRIPTION OF THE INVENTION

Referring to the Figures, wherein like numerals indicate like parts throughout the several views, a composite article made in accordance with a method of the present invention is shown generally at 20.

Figure 1:
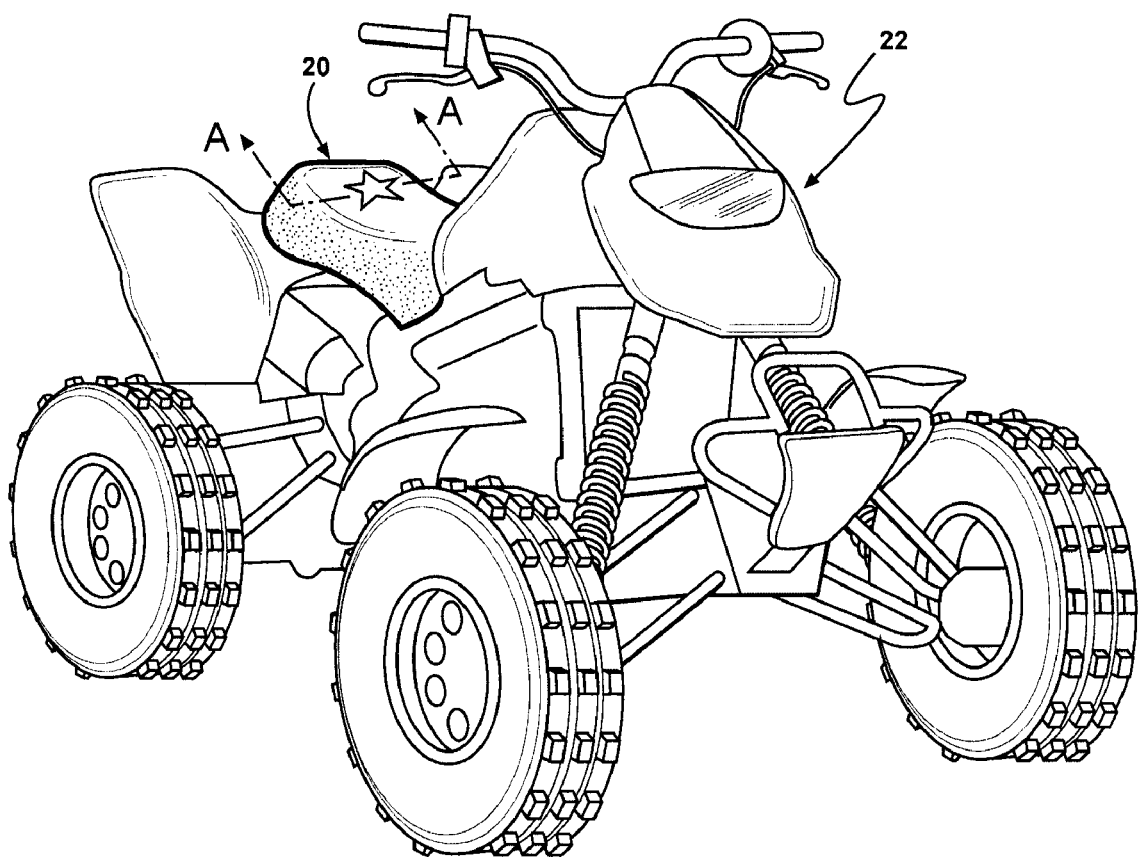
FIG. 1 is a perspective view of a seat of an all-terrain vehicle and a composite article used as skin for the seat made in accordance with the method of the present invention.

In one embodiment, as shown in FIG. 1, the composite article 20 is a skin for covering a seat of an all-terrain vehicle (ATV) 22. While the composite article 20 is shown as a skin for covering the seat of the ATV 22, it is to be appreciated that in other embodiments, the composite article 20 may be further defined as at least one of a headrest, a trim panel, a seat, a pillar trim panel, an instrument panel, a door panel, and an armrest. It is to be appreciated that the present invention is not limited to any particular use of the composite article 20.

Figure 6:
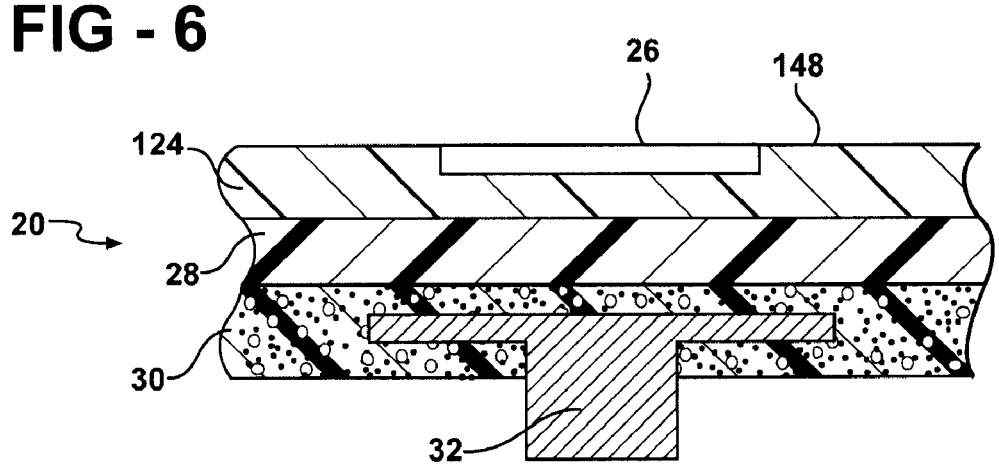
FIG. 6 is a partial cross-sectional side view of another embodiment of the composite article of FIG. 1 taken along line A-A.

In one embodiment, as shown in FIGS. 3, 5 and 6, the composite article 20 includes a paint layer 124 and a decal layer 26. In another embodiment, as shown in FIGS. 2 and 4, the composite article 20 includes an elastomeric layer 24 instead of the paint layer 124. For simplicity, the paint layer 124 and the elastomeric layer 24 are collectively referred to herein as the first layer 24, 124. In one embodiment, as shown in FIG. 3, the first layer 24, 124 and the decal layer 26 are adjacent to each other, i.e. the first layer 24, 124 and the decal layer 26 are substantially co-planar. In another embodiment, as shown in FIGS. 2 and 4-6, the first layer 24, 124 is adjacent to and substantially overlaps the decal layer 26. In another embodiment, as also shown in FIG. 4, the decal layer 26 is raised from and adjacent to the first layer 24, 124, i.e., the decal layer 26 is raised from the first layer 24, 124. In yet another embodiment, the decal layer 26 is recessed in the first layer 24, 124. In other embodiments, the composite article 20 may include three or more adjacent layers in any combination of the relationships to each other as shown in FIGS. 2-6. For example, the composite article 20 may include a picture decal, a separate text decal, a red layer, and a black layer. It is to be appreciated that the term 'decal' may also be referred to as a logo or label.

When the composite article 20 includes the paint layer 124, the paint layer 124 is formed from a paint composition. The paint composition may be any paint composition known in the art. For example, the paint composition may be selected from the group of polyurethane-based paint compositions, acrylic-based paint compositions, polyester-based paint compositions, and combinations thereof. The paint layer 124 provides a desired adhesion, color, UV degradation resistance, texture, or grain pattern quality of the composite article 20. For example, as shown in FIG. 5, the paint layer 124 has a textured surface 146. Alternatively, as shown in FIG. 3, the paint layer 124 has a smooth surface 148. It is to be appreciated that at least a portion of the paint layer 124 may have the textured surface 146 and at least a portion of the paint layer 124 may have the smooth surface 148.

When the composite article 20 includes the elastomeric layer 24 instead of the paint layer 124, the elastomeric layer 24 is typically formed from a polyurethane elastomer composition. The polyurethane elastomer composition may be any polyurethane elastomer composition known in the art and preferably includes an isocyanate and a polyol.

The isocyanate may be any isocyanate known in the art. For example, the isocyanate may be selected from the group of aromatic isocyanates, aliphatic isocyanates, and combinations thereof. Examples of suitable isocyanates for purposes of the present invention include diphenylmethane diisocyanates (MDIs), polymeric diphenylmethane diisocyanates (pMDIs), toluene diisocyanates (TDIs), hexamethylene diisocyanates (HDIs), dicyclohexylmethane diisocyanates (HMDIs), isophorone diisocyanates (IPDIs), and combinations thereof. Specific examples of other suitable isocyanates include Lupranate® M70L Isocyanate, Lupranate® M70R Isocyanate, Lupranate® MP102 Isocyanate, and Lupranate® M20S Isocyanate, which are all commercially available from BASF Corporation of Wyandotte, Mich. In one embodiment, the polyurethane elastomer composition includes an aliphatic isocyanate, which is useful for imparting the composite article 20 with increased UV degradation resistance. This embodiment is also useful when the composite article 20 lacks or is substantially free of the paint layer 124. In another embodiment, the polyurethane elastomer composition includes an aromatic isocyanate, which is useful for reducing an overall cost of the composite article 20. This embodiment is also useful when the composite article 20 includes the paint layer 124.

The polyol may be any polyol known in the art. For example, the polyol may be an aromatic or aliphatic polyol and may further be a polyether or polyester polyol. In one embodiment, the polyol is an aliphatic polyol, which is useful for imparting the composite article 20 with increased UV degradation resistance. This embodiment is also useful when the composite article 20 lacks or is substantially free of the paint layer 124. In another embodiment, the polyurethane elastomer composition includes an aromatic polyol, which is useful for reducing the overall cost of the composite article 20. This embodiment is also useful when the composite article 20 includes the paint layer 124. It is to be appreciated that the polyol typically includes two or more hydroxyl groups that are reactive with the isocyanate. In addition, the polyurethane elastomer composition may include two or more different isocyanates and/or two or more different polyols. For example, the polyurethane composition may include an MDI, a diol and a triol, an MDI and two different triols, etc. In one embodiment, the polyurethane elastomer composition is a urethane elastomer system, which includes a resin composition and an isocyanate component. A specific example of a suitable urethane elastomer system is commercially available from BASF Corporation or Wyandotte, Mich., under the trade name Elastoskin®.

The polyurethane elastomer composition may also include one of more additives. The additive is typically selected from the group of UV packages, pigments, and combinations thereof. The UV package is typically selected from the group of ultra violet absorbers, hindered amine light stabilizers, and combinations thereof. The pigment may be any pigment known in the art such as carbon black. Examples of other suitable additives for purposes of the present invention include catalysts, surfactants, defoamers, anti-foamers, chain extenders, chain terminators, fillers, processing stabilizers, silicas, molecular sieves, and water scavengers. The elastomeric layer 24 provides a desired color, UV degradation resistance, strength, tear resistance, water resistance, texture, or grain pattern quality of the composite article 20. For example, as shown in FIG. 4, the elastomeric layer 24 has a textured surface 46. Alternatively, as shown in FIG. 2, the elastomeric layer 24 has a smooth surface 48. It is to be appreciated that at least a portion of the elastomeric layer 24 may have the textured surface 46 and at least a portion of the same elastomeric layer 24 may have the smooth surface 48. It is to be appreciated that the term 'layer' may also be referred to as a film or membrane.

Figure 7:
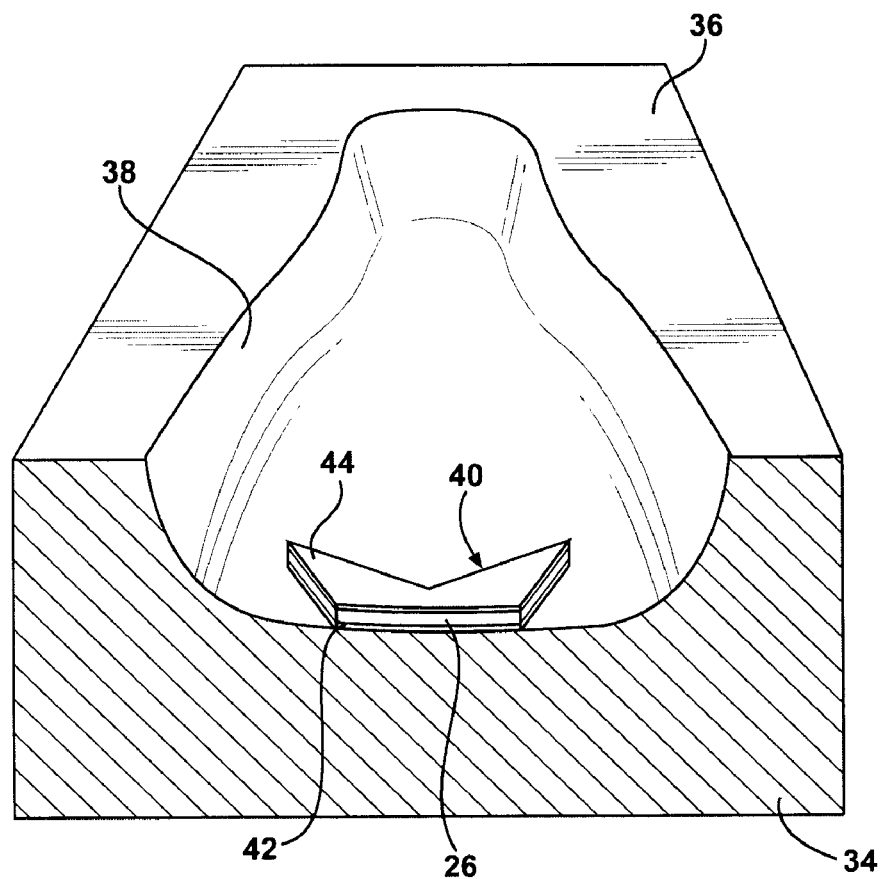
FIG. 7 is a cross-sectional perspective view of a mold including a surface defining a mold cavity and a decal on the surface of the mold.

Prior to forming the composite article 20, a decal 40, as shown in FIG. 7, includes a backing paper layer 42, i.e., a release liner, a protective paper layer 44, i.e., a cover sheet, disposed adjacent the backing paper layer 42, and the decal layer 26 disposed between the backing paper layer 42 and the protective paper layer 44. In another embodiment, the decal 40 includes only the decal layer 26. In other embodiments, the decal 40 may include the decal layer 26 and either the backing paper layer 42 or the protective paper layer 44 adjacent the decal layer 26. After forming the composite article 20, the composite article 20 includes the decal layer 26 absent the protective paper layer 44 and, optionally, absent the backing paper layer 42.

As alluded to above, in one embodiment, the decal 40 includes the backing paper layer 42 adjacent to the decal layer 26. More specifically, the backing paper layer 42 may substantially overlap and be in contact with the decal layer 26. The backing paper layer 42 can protect the decal layer 26 from scratching, scuffing, contamination and distortion. The backing paper layer 42 may be formed from any flexible or semi-rigid material known in the art. For example, the flexible or semi-rigid material may be selected from the group of papers, polymers, plastics, and combinations thereof.

Additionally, the protective paper layer 44 may also substantially overlap and be in contact with the decal layer 26, opposite the backing paper layer 42, to sandwich the decal layer 26 therebetween. The protective paper layer 44 can protect the decal layer 26 from scratching, scuffing, contamination or distortion. The protective paper layer 44 may be formed from a second flexible or semi-rigid material. The second flexible or semi-rigid material may be formed from any flexible or semi-rigid material known in the art and may be the same or different from the flexible or semi-rigid material of the backing paper layer 42. For example, as with the flexible material, the second flexible material can be selected from the group of papers, polymers, plastics, and combinations thereof.

The decal layer 26 provides a desired identifying or informative feature of the composite article 20. For example, the decal layer 26 may present a company name, logo, picture, text, warning, instruction, indicia, or symbol. In another embodiment, a plurality of the decal layer 26 may present a company name, logo, picture, text, warning, instruction, indicia, or symbol. For example, one decal layer 26 may present each letter in a company name. The decal layer 26 may be any size and shape. For example, the decal layer 26 can be a rectangular sheet or film. In one embodiment, as shown in FIGS. 2-6, the decal layer 26 is essentially planar. In other embodiments, the decal layer 26 may present depressed and raised portions. For example, the decal layer 26 can present a raised relief of a company name for the composite article 20.

The decal layer 26 may be formed from any decal material known in the art. In one embodiment, the decal layer 26 is formed from a polyurethane composition. As with the polyurethane elastomer composition, the polyurethane composition may also include the isocyanate and the polyol. The isocyanate and the polyol of the polyurethane composition may be the same or different from the isocyanate and the polyol of the polyurethane elastomer composition. Furthermore, the polyurethane composition may also include one or more additives that may be the same or different from the additives of the polyurethane elastomer composition. In another embodiment, the decal layer 26 is formed from a lacquer composition. The lacquer composition may be any lacquer composition known in the art. For example, the lacquer composition may be selected from the group of nitrocellulose-based lacquer compositions, acrylic-based lacquer compositions, and combinations thereof. The lacquer composition may also include one of more additives that may be the same or different from the additives of the polyurethane elastomer composition. In yet another embodiment, the decal layer 26 is formed from a coating composition. The coating composition may be any coating composition known in the art. For example, the coating composition may be selected from the group of ink compositions, lacquer compositions, paint compositions, and combinations thereof. The coating composition may also include one of more additives that may be the same or different from the additives of the polyurethane elastomer composition. The ink composition as the coating composition may be any ink composition known in the art. For example, the ink composition may be selected from the group of water-based inks, solvent-based inks, dye-based inks, pigment-based inks, and combinations thereof. For example, the ink composition may be an acrylic ink composition. The lacquer composition and the paint composition as the coating composition may be the same or different from the previously described lacquer and paint compositions.

Optionally, the decal layer 26 may include an ink layer disposed adjacent a side of the decal layer 26. For example, the ink layer can be disposed between the protective paper layer 44 and the decal layer 26 such that the protective paper layer 44 covers and protects the ink layer. Alternatively, the ink layer may be disposed between the backing paper layer 42 and the decal layer 26. It is to be appreciated that the ink layer can also be disposed on both sides of the decal layer 26. The ink layer is typically formed from a second ink composition. The second ink composition may be the same or different from the ink composition of the decal layer 26. In one embodiment, the decal layer 26 protects the ink layer when the ink layer is disposed between the decal layer 26 and the first layer 24, 124. In another embodiment, the ink layer is disposed on the decal layer 26 opposite the first layer 24, 124. The ink composition or the second ink composition may be applied to the decal layer 26 to form the ink layer by any method known in the art. For example, the second ink composition can be applied to the decal layer 26 by a printing process or apparatus such as by an inkjet printing process, to form the ink layer on the decal layer 26. In other embodiments, the second ink composition may be integral to the decal layer 26 rather than disposed adjacent the decal layer 26. The ink layer and/or the integral ink further strengthen a bond between the decal layer 26 and the first layer 24, 124 of the composite article 20. The ink layer and/or the integral ink may present a company name, logo, picture, text, warning, instruction, indicia, or symbol for the decal layer 26.

Referring to FIGS. 3, 5, and 6, the composite article 20 further includes an elastomeric backing layer 28. In one embodiment, as shown in FIG. 3, the elastomeric backing layer 28 is formed on the first layer 24, 124 and the decal layer 26. The elastomeric backing layer 28 may substantially overlap both the first layer 24, 124 and the decal layer 26. In another embodiment, as shown in FIGS. 5 and 6, the elastomeric backing layer 28 is formed on the first layer 24, 124 and is spaced from the decal layer 26. The elastomeric backing layer 28 may substantially overlap the first layer 24, 124. The first layer 24, 124 and the decal layer 26 are typically relatively thin compared to the elastomeric backing layer 28. However, it is to be appreciated that the first layer 24, 124, the decal layer 26, and the elastomeric backing layer 28 may each be of relatively the same thickness.

The elastomeric backing layer 28 is formed from a second polyurethane elastomer composition. The second polyurethane elastomer composition may be the same or different from the polyurethane elastomer composition of the elastomeric layer 24. In one embodiment, the second polyurethane elastomer composition includes one or more aromatic components such as the isocyanate and/or the polyol, which are useful for reducing manufacturing cost of the composite article 20 in comparison to using aliphatic components. Like the polyurethane elastomer composition of the elastomeric layer 24, the second polyurethane elastomer composition may also include one of more additives that may be the same or different from the additives of the polyurethane elastomer composition. The elastomeric backing layer 28 formed from the second polyurethane elastomer composition provides a desired elastic tactile, strength, tear resistance, and water resistance quality of the composite article 20.

Referring to FIGS. 4-6, the composite article 20 further includes a foam backing layer 30. In one embodiment, as shown in FIG. 4, the foam backing layer 30 is formed on the elastomeric layer 24. The foam backing layer 30 may substantially overlap the elastomeric layer 24. In another embodiment, as shown in FIGS. 5 and 6, the foam backing layer 30 is formed on the elastomeric backing layer 28. The foam backing layer 30 may substantially overlap the elastomeric backing layer 28. The first layer 24, 124, the decal layer 26, and the elastomeric backing layer 28 are typically relatively thin compared to the foam backing layer 30. However, it is to be appreciated that that the first layer 24, 124, the decal layer 26, the elastomeric backing layer 28, and the foam backing layer 30 may each be of relatively the same thickness.

The foam backing layer 30 is formed from a polyurethane foam composition. As with the polyurethane elastomer compositions, the polyurethane foam composition may include the isocyanate and the polyol that may be the same or different from the isocyanate and the polyol of the polyurethane elastomer compositions. Additionally, the foam backing layer 30 is formed in the presence of a blowing agent. The blowing agent may be any blowing agent known in the art. In one embodiment, the polyurethane foam composition includes one or more aromatic components such as the isocyanate and/or polyol, which can reduce the overall cost of the composite article 20 relative to using aliphatic components, as previously described above with the polyurethane elastomer composition. The blowing agent is typically selected from the group of physical blowing agents, chemical blowing agents, and combinations thereof. For example, the blowing agent can comprise water as a chemical blowing agent. Furthermore, the polyurethane foam composition may also include one of more additives that may be the same or different from the additives of the polyurethane elastomer compositions. The foam backing layer 30 provides a desired elastic tactile and energy absorption quality of the composite article 20.

Referring to FIGS. 5 and 6, the composite article 20 further includes a substrate 32. In one embodiment, as shown in FIG. 5, the substrate 32 is applied to the foam backing layer 30. The substrate 32 may substantially overlap the foam backing layer 30. In another embodiment, as shown in FIG. 6, a portion of the substrate 32 is embedded within the foam backing layer 30. The substrate 32 may be formed from any rigid material known in the art. For example, the rigid material may be selected from the group of metals such as steel, plastics such as ABS, polymers, woods, composites, and combinations thereof. The substrate 32 stiffens and reinforces the foam backing layer 30 and may further provide an interface between the composite article 20 and an attached object, e.g., the ATV 22.

The method of forming the composite article 20 occurs in a mold 34. One example of a mold 34 that is suitable for purposes of the present invention is shown in FIG. 7. The mold 34 includes a surface 36 that defines a mold cavity 38. The mold 34 may be any mold known in the art such as an open-type or a closed-type mold. For example, the closed-type mold typically includes an upper half and a lower half that come together to define the mold cavity 38. The surface 36 may have texture or grain patterns formed therein. The texture or grain pattern may be transferred to the corresponding first layer 24, 124. For example, the surface 36 can have a texture pattern that results in the first layer 24, 124 having the textured surface 46, 146 as shown in FIGS. 4 and 5. Likewise, the surface 36 can have a smooth surface pattern that results in the first layer 24, 124 having the smooth surface 48, 148 as shown in FIGS. 2, 3 and 6. In other embodiments (not shown), the surface 36 may include three or more texture and/or grain patterns to result in the first layer 24, 124 having different texture or grain patterns. In yet another embodiment, the mold 34 defines a hole, i.e., a vacuum port, extending through the surface 36 into the mold cavity 38 for supplying fluid to and from the mold cavity 38. In other embodiments, the mold 34 may define more than one hole extending through the surface 36 into the mold cavity 38. Typically, the fluid is a gas such as air.

To form the composite article 20, the decal 40 is introduced to the surface 36 of the mold 34. As shown in FIG. 7, the backing paper layer 42 is disposed adjacent the surface 36 of the mold 34, the protective paper layer 44 is disposed adjacent the backing paper layer 42, and the decal layer 26 is disposed between the backing paper layer 42 and the protective paper layer 44. Typically, the protective paper layer 44 is removed from the decal 40 after introducing the decal to the surface 36 of the mold 34. Alternatively, the protective paper layer 44 is removed from the decal 40 prior to the step of introducing the decal 40 to the surface 36 of the mold 34. It is to be appreciated that two or more of the decals 40 may be introduced to the surface 36 of the mold 34. In another embodiment, the coating composition is applied to the surface 36 of the mold 34 as the decal 40, i.e., the decal layer 26. In another embodiment, the coating composition is applied to a backside of a mold release agent previously introduced to the surface 36 of the mold 34. The coating composition may be applied to the surface 36 of the mold 34 or the backside of the mold release agent by any method known in the art. In one embodiment, the coating composition is printed onto the surface 36 of the mold 34. For example, the coating composition, e.g., the ink composition, can be printed onto the surface 36 of the mold 34 by an inkjet head. Printing is especially useful when a plurality of the decal 40 is introduced to the surface 36 of the mold 34 as the decal 40. In other embodiments, the coating composition may be applied to the surface 36 of the mold 34 by spraying or rolling. For example, a stencil can be used as an outline of the decal 40 and the coating composition can be sprayed onto the stencil as the decal 40. In one embodiment, the surface 36 of the mold 34 includes a locator-mark conformed to the shape of the decal 40 for properly locating the decal 40 on the surface 36 of the mold 34. In another embodiment, the locator-mark is slightly recessed into the surface 36 of the mold 34 for properly locating, retaining, and offsetting the decal 40 from the surface 36 of the mold 34. For example, the decal layer 26 is slightly raised relative to the first layer 24, 124 as shown in FIG. 4. In addition, the locator-mark typically compensates for a thickness of the backing paper layer 42 when included with the decal 40 such that the decal layer 26 and the first layer 24, 124 are substantially co-planar, as shown in FIGS. 2 and 3.

Optionally, vacuum may be applied through the hole in the surface 36 to retain the decal 40 adjacent the surface 36 of the mold 34. Vacuum may be applied by any method known in the art. For example, a vacuum pump can draw air through the hole from the mold cavity 38 for retaining the decal 40 over the hole. Vacuum maintains the orientation of the decal 40 on the surface 36 of the mold 34 for ease of use, performance, and cost benefits. For example, vacuum can prevent the decal 40 from being disrupted by airflow across the surface 36 of the mold 34. The vacuum applied through the hole may be continuous or intermittent. It is to be appreciated that any suitable pressure differential created between the mold cavity 38 and the hole may be used to retain the decal 40 adjacent the surface 36 of the mold 34. In another embodiment, an adhesive layer is disposed between the backing paper layer 42 and the surface 36 of the mold 34. In one embodiment, the adhesive layer is applied to the backing paper layer 42 prior to the step of introducing the decal 40 to the surface 36 of the mold 34. In another embodiment, the adhesive layer is applied onto the surface 36 of the mold 34 prior to the step of introducing the decal 40 to the surface 36 of the mold 34. The adhesive layer may be any adhesive known in the art. For example, the adhesive layer may be selected from the group of polymers, glues, epoxies, resins, waxes, double-sided tapes, pressure-sensitive adhesives, and combinations thereof. The adhesive layer maintains the orientation of the decal 40 on the surface 36 of the mold 34. In yet another embodiment, static charge is applied to the decal 40 to retain the decal 40 adjacent the surface 36 of the mold 34. For example, static charge between the decal 40 and the surface 36 can retain the decal 36 adjacent the surface 36 of the mold 34. Static charge maintains the orientation of the decal 40 on the surface 36 of the mold 34.

In one embodiment, after the decal 40 is on the surface 36 of the mold 34, the paint composition is applied into the mold cavity 38 to form the paint layer 124. Alternatively, in another embodiment, the polyurethane elastomer composition instead of the paint composition is applied into the mold cavity 38 to form the elastomeric layer 24. For simplicity, the paint composition and the polyurethane elastomer composition are collectively referred to herein as the first composition. The first composition may be applied through any method known in the art. For example, the first composition can be applied by spraying, by directing a powdered material, or by reactive injecting into the mold cavity 38. In one embodiment, the protective paper layer 44 is removed from the decal 40 prior to the step of applying the first composition into the mold cavity 38 such that first layer 24, 124 substantially overlaps the decal layer 26. In another embodiment, the protective paper layer 44 is removed from the decal 40 after to the step of applying the first composition into the mold cavity 38 such that the first layer 24, 124 does not overlap the decal layer 26.

Optionally, when the composite article 20 includes the elastomeric backing layer 28, the second polyurethane elastomer composition is applied into the mold cavity 38 to form the elastomeric backing layer 28 after the step of applying the first composition into the mold cavity 38. The second polyurethane elastomer composition may be applied through any method known in the art, such as by spraying or reactive injecting. In one embodiment, the second polyurethane elastomer composition is applied while the first layer 24, 124 is still wet. In another embodiment, the first layer 24, 124 is cured or otherwise set to a generally hardened conditioned to prevent mixing or cross-contamination with the second polyurethane elastomer composition. The first layer 24, 124 may be cured by heating the mold 34. Typically, the mold 34 is heated to a temperature of from about 140° F. to about 170° F. for decreasing cure time of the first layer 24, 124 and optionally, the backing layer 28. However, the mold 34 may be heated to any temperature for curing the first layer 24, 124 that preferably does not degrade the first layer 24, 124 and, optionally, the mold 34 may be unheated, i.e., left at ambient temperature such as about 70° F.

After the first layer 24, 124 and, optionally, the elastomeric backing layer 28 are formed, the composite article 20 is demolded, i.e., removed from the mold 34. In one embodiment, the composite article 20 is demolded from the mold 34 while the elastomeric backing layer 28 is still wet. In another embodiment, the elastomeric backing layer 28 is cured or otherwise set to a generally hardened conditioned to prevent contamination or disturbance of the elastomeric backing layer 28.

In one embodiment, the backing paper layer 42 remains on the surface 36 of the mold 34 after demolding the composite article 20 from the mold 34. This often occurs when vacuum or the adhesive is applied to the backing paper layer 42. In another embodiment, the backing paper layer 42 remains on the decal layer 26 and therefore attached to the composite article 20 after demolding the composite article 20 from the mold 34. This often occurs when vacuum is reduced or removed or the adhesive is not applied to the backing paper layer 42. The composite article 20 including the backing paper layer 42 still attached to the decal layer 26 may then be further processed, e.g., sprayed with a clear coat, such that the backing paper layer 42 protects the decal layer 26 from the clear coat.

In one embodiment, the polyurethane foam composition is applied onto the first layer 24, 124 and optionally, the decal layer 26, to form the foam backing layer 30. In another embodiment, when the elastomeric backing layer 28 is present, the polyurethane foam composition is applied onto the elastomeric backing layer 28 to form the foam backing layer 30. It is to be appreciated that the step of applying the polyurethane foam composition may occur while the composite article 20 is still within the mold cavity 38, or after the composite article 20 has been demolded from mold 34. The polyurethane foam composition may be applied onto the first layer 24, 124, the decal layer 26, and alternatively onto the elastomeric backing layer 28 to form the foam backing layer 30 through any method known in the art. For example, the polyurethane foam composition can be applied by pouring the polyurethane foam composition into the mold cavity 38, by reactive injecting the polyurethane foam composition into the mold cavity 38, or by spraying the polyurethane foam composition into the mold cavity 38. As known to those of ordinary skill in the art, reactive injecting, i.e., injection, of the polyurethane foam composition typically occurs in a closed-type mold.

In one embodiment, the substrate 32 is applied onto the foam backing layer 30. For example, the substrate 32 can be glued onto the foam backing layer 30 with an adhesive. In another embodiment, the substrate 32 is introduced into the mold cavity 38 prior to forming the foam backing layer 30. For example, the substrate 32 can be introduced into the mold cavity 38 prior to the step of applying the polyurethane foam composition to the elastomeric backing layer 28 such that the substrate 32 is embedded within the foam backing layer 30. It is to be appreciated that the step of applying the substrate 32 onto or embedding the substrate 32 within the foam backing layer 30 may occur prior to the step of demolding the composite article 20 from the mold 34, or after the step of demolding the composite article 20 from the mold 34.

Optionally, a second decal 40 may be introduced to the surface 36 of the mold 34 after the step of demolding the composite article 20 from the mold 34. The second decal 40 may be the same or different from the decal 40. For example, a second decal layer 26 can have a different pattern, e.g., a different picture, than the decal layer 26. In one embodiment, when the backing paper layer 42 remains on the surface 36 of the mold 34 after demolding the composite article 20, the backing paper layer 42 is removed from the surface 36 of the mold 34 prior to the step of introducing the second decal 40 to the surface 36 of the mold 34. In another embodiment, the backing paper layer 42 is left on the surface 36 of the mold 34.

Optionally, as previously alluded to, a mold release agent may be introduced to the surface 36 of the mold 34. The mold release agent may be any mold release agent known in the art. For example, the mold release agent may be selected from the group of silicones, soaps, waxes, solvents and combinations thereof. In one embodiment, the mold release agent is introduced to the surface 36 of the mold 34 prior to the step of introducing the decal 40 to the surface 36 of the mold 34. In another embodiment, the mold release agent is introduced to the surface 36 of the mold 34 after the step of introducing the decal 40 to the surface 36 of the mold 34. For example, the mold release agent can be introduced to the surface 36 of the mold 34 and onto the decal 40, such that the protective paper layer 44 protects the decal layer 26 from the mold release agent. The protective paper layer 44 may then be removed from the decal 40 after the mold release agent is introduced. In yet another embodiment, the mold release agent is introduced to the surface 36 of the mold 34 after the step of demolding the composite article 20 from the mold 34. For example, the mold release agent can be introduced to the surface 36 of the mold 34 and onto the backing paper layer 42 remaining in the mold 34 after demolding the composite article 20 from the mold 34. The backing paper layer 42 covers a portion of the surface 36 of the mold 34, i.e., a portion directly beneath the backing paper layer 42, thereby protecting the portion of the surface 36 from the mold release agent. The backing paper layer 42 may then be removed from the surface 36 of the mold 34. In yet another embodiment, fluid is supplied through the hole into the mold cavity 38 simultaneous with the step of introducing the mold release agent to the surface 36 of the mold 34. The fluid, e.g., air, supplied through the hole into the mold cavity 38 prevents the mold release agent from entering the hole. In yet another embodiment, fluid is supplied through the hole into the mold cavity 38 after the step of introducing the mold release agent to the surface 36 of the mold 34. The fluid supplied through the hole clears the mold release agent from the hole. The fluid may be supplied at any flow rate through the hole.

The mold release agent may be introduced to the surface 36 of the mold 34 through any method known in the art, such as by spraying. The mold release agent facilitates the demolding of the composite article 20 from the mold 34.

The examples set forth below illustrate the method of the present invention and are not to be construed as limiting.

Examples

Five examples, specifically, Examples 1-5, of the composite article are prepared. Specific components used to form the examples along with select process conditions and results are shown below in Table 1.

TABLE 1

|  | Example No. | | | | |
| --- | --- | --- | --- | --- | --- |
|  | 1 | 2 | 3 | 4 | 5 |
| Decal Number | 1 | 1 | 1 | 1 | 2 |
| Ink Layer Number | 1 | 2 | 1 | 2 | none |
| Paint Layer Number | 1 | 1 | 2 | 2 | 3 |
| Backing Layer | Yes | Yes | Yes | Yes | Yes |
| Formation Specifications | | | | | |
| Mold Temperature, ° F. | 150 | 150 | 150 | 150 | 150 |
| Mold Release Agent used? | Yes | Yes | Yes | Yes | Yes |
| Polyurethane Temperature, ° F. | 150 | 150 | 150 | 150 | 150 |
| Flow Rate, grams/sec | 20 | 20 | 20 | 20 | 18 |
| Nozzle Type, ° Fan/° Holder | 80/90 | 80/90 | 80/90 | 80/90 | 80/90 |
| Average Peel Strength, lbs/in | 7.990 | 6.630 | 9.473 | 7.117 | — |

Decal Number 1 includes a backing paper layer and a decal layer adjacent to the backing paper layer. The decal layer is formed from a polyurethane composition. The backing paper layer is formed from a paper. Decal Number 1 is commercially available from Serigraph, Inc. of West Bend, Wis.

Ink Layer Number 1 is formed from a clear ink composition and is disposed on the decal layer of Decal Number 1 opposite the backing paper layer.

Ink Layer Number 2 is formed from a red ink composition and is disposed on the decal layer of Decal Number 1 opposite the backing paper layer.

Decal Number 2 includes a backing paper layer and a protective paper layer such that the decal layer is sandwiched between the backing and protective paper layers. The decal layer is formed from a lacquer composition. The backing paper layer and the protective paper layer are formed from a paper. Decal Number 2 is commercially available from Franz Barta GmbH, of Wien, Austria.

Paint Layer Number 1 is formed from a water-based paint composition, commercially available from Red Spot of Evansville, Ind.

Paint Layer Number 2 is formed from a water-based paint composition, commercially available from Randolph Products of Chicopee, Mass.

Paint Layer Number 3 is a water-based paint composition, commercially available from Red Spot of Evansville, Ind.

Backing Layer is formed from a polyurethane elastomer composition, which is further described below.

Mold Release Agent is a water based mold release agent, commercially available from Franklynn Industries of Cincinnati, Ohio.

Average peel strength is determined according to ASTM D 902. Specifically, the examples are tested with a one-inch wide decal strip sample, pulled at a 180° peel angle, at a rate of one inch per minute under maximum resistance. The test is repeated three times for each example to determine the average peel strength of the decal.

To form a first composite article, a mold including a surface defining a mold cavity is used. In Examples 1-4, the surface of the mold defines a hole extending through the surface into the mold cavity. The mold is heated to a temperature of 150° F. In Examples 1-4, the decal is introduced to the surface of the mold. The decal includes a backing paper layer and a decal layer adjacent to the backing paper layer. Vacuum is applied through the hole to the backing paper layer to retain the decal. In Example 5, double-sided tape is applied to a backing paper layer to retain the decal. The decal is then introduced to the surface of the mold with the double-sided tape adjacent to the surface of the mold. The decal includes a backing paper layer and a protective paper layer such that the decal layer is sandwiched between the backing and protective paper layers.

A mold release agent is then manually sprayed into the mold cavity. In Examples 1-4, air is supplied through the hole into the mold cavity simultaneously during the step of spraying the mold release agent into the mold cavity to prevent the mold release agent from entering the hole. In Example 5, the mold release agent is sprayed over the protective paper layer of the decal, and the protective paper layer is then removed from the decal and the mold.

A paint composition is then manually sprayed into the mold cavity and onto the decal to form a paint layer. The paint layer is allowed to cure for approximately one minute.

A resin composition and an isocyanate are each heated to a temperature of 150° F. The resin composition and the isocyanate are then mixed at a 100 parts resin composition to 37.7 parts isocyanate ratio to form the polyurethane elastomer composition. The resin composition includes a diol having a hydroxyl number of from 28 to 30 mg KOH/gm and a triol having a hydroxyl number of from 24 to 26 mg KOH/gm, which are both commercially available from BASF Corporation of Wyandotte, Mich. The resin composition further includes the following additives found in a typical resin composition: a processing stabilizer, catalysts, light stabilizers, an anti-foaming agent, fumed silica, a molecular sieve, chain extenders, and a chain terminator. The isocyanate is a modified pure diphenylmethane diisocyanate (MDI) having a NCO content of 23.0%, which is commercially available from BASF Corporation of Wyandotte, Mich. In Examples 1-4, the polyurethane elastomer composition is then sprayed into the mold cavity and over the paint layer at a flow rate of 20 grams per second to form an elastomeric backing layer. In Example 5, the polyurethane elastomer composition is then sprayed into the mold cavity and over the paint layer at a flow rate of 18 grams per second to form an elastomeric backing layer. The elastomeric backing layer is allowed to cure for approximately two minutes.

After the paint layer and the elastomeric backing layer are cured, the composite article including the decal layer, the paint layer, and the elastomeric backing layer is demolded from the mold. In Examples 1-4, the backing paper layer remains on the decal layer. In Example 5, the backing paper layer and the double-sided tape remain on the surface of the mold.

To form a second composite article that is the same as the composite article, the mold release agent is manually sprayed into the mold. In Examples 1-4, air is supplied through the hole into the mold cavity simultaneously during the step of spraying the mold release agent into the mold cavity to prevent the mold release agent from entering the hole. In Example 5, the mold release agent is manually sprayed into the mold and onto the backing paper layer remaining on the surface of the mold, and the backing paper layer is then removed from the surface of the mold.

In Examples 1-4, a second decal that is the same as the decal is then placed over the hole and retained with vacuum applied through the hole. In Example 5, a second decal that is the same as the decal is then placed onto the double-sided tape remaining on the surface of the mold. The method as set forth above for forming the first composite article is then repeated for the second composite article. The overall method is then repeated five times for reproducibility.

All of the decal layers on the composite articles exhibit excellent bond strength, i.e., peel strength, relative to the composite article. It is believed that the bond strength between the decal layer and the paint layer of the composite article is actually higher than the bond strength between the paint layer and the elastomeric backing layer of the composite article. In addition, it is believed that the bond strength between the decal layer and the paint layer is increased when an ink layer is disposed between the decal layer and the paint layer.

The present invention has been described herein in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described within the scope of the appended claims.

What is claimed is:

1. A method of forming a composite article in a mold including a surface defining a mold cavity, said method comprising the steps of:
introducing a decal to the surface of the mold, the decal including a backing paper layer disposed adjacent the surface of the mold and a decal layer overlaying the backing paper layer with the decal layer having an inner surface opposite the surface of the mold;
applying a paint composition into the mold cavity and over the mold surface and the inner surface of the decal layer to form a paint layer having an outer surface and an inner surface, with the inner surface of the paint layer opposite the surface of the mold, and at least a portion of the outer surface of the paint layer bonded to the inner surface of the decal layer;

applying a polyurethane elastomer composition into the mold cavity and over the inner surface of the paint layer to form an elastomeric backing layer bonded to the inner surface of the paint layer; and demolding the composite article from the mold;

wherein the decal layer has a thickness less than or equal to a combined thickness of the paint and elastomeric backing layers.

2. The method as set forth in claim 1 further comprising the step of applying a polyurethane foam composition onto the elastomeric backing layer to form a foam backing layer.

3. The method as set forth in claim 2 further comprising the step of applying a substrate to the foam backing layer.

4. The method as set forth in claim 2 further comprising the step of partially curing the elastomeric backing layer prior to the step of applying the polyurethane foam composition onto the elastomeric backing layer to form the foam backing layer.

5. The method as set forth in claim 4 further comprising the step of heating the mold to partially cure the elastomeric backing layer.

6. The method as set forth in claim 1 further comprising the step of introducing a mold release agent to the surface of the mold prior to the step of applying the paint composition into the mold cavity.

7. The method as set forth in claim 6 wherein the surface of the mold defines a hole extending through the surface into the mold cavity for supplying fluid to and from the mold cavity and further comprising the step of supplying fluid through the hole into the mold cavity.

8. The method as set forth in claim 7 wherein the step of supplying fluid through the hole into the mold cavity is conducted simultaneous with the step of introducing the mold release agent to the surface of the mold for preventing the mold release agent from entering the hole.

9. The method as set forth in claim 7 further comprising the step of applying vacuum through the hole in the surface to retain the decal adjacent the surface of the mold.

10. The method as set forth in claim 1 wherein the mold defines a hole extending through the surface into the mold cavity for supplying fluid to and from the mold cavity and further comprising the step of applying vacuum through the hole in the surface to retain the decal adjacent the surface of the mold.

11. The method as set forth in claim 1 wherein the decal layer is formed from a coating composition.

12. The method as set forth in claim 11 wherein the coating composition is selected from the group of ink compositions, lacquer compositions, paint compositions, and combinations thereof.

13. The method as set forth in claim 11 wherein the decal layer is introduced into the mold cavity adjacent the surface of the mold by applying the coating composition onto the backing paper layer.

14. The method as set forth in claim 1 wherein the decal further includes a protective paper layer different than and disposed adjacent to the backing paper layer with the decal layer sandwiched between the backing paper layer and the protective paper layer.

15. The method as set forth in claim 14 wherein the protective paper layer is removed from the decal prior to the step of applying the paint composition into the mold cavity.

16. The method as set forth in claim 14 wherein the decal further includes an adhesive layer disposed between the backing paper layer and the surface of the mold.

17. The method as set forth in claim 14 wherein the decal layer is formed from a lacquer composition.

18. The method as set forth in claim 14 wherein the decal layer is formed from a polyurethane composition.

19. The method as set forth in claim 18 wherein the paint composition is selected from the group of polyurethane-based paint compositions, acrylic-based paint compositions, polyester-based paint compositions, and combinations thereof.

20. The method as set forth in claim 14 further comprising the step of introducing a mold release agent to the surface of the mold after the step of demolding the composite article from the mold.

21. The method as set forth in claim 20 further comprising the step of removing the backing paper layer from the surface of the mold after the step of introducing the mold release agent to the surface of the mold.

22. The method as set forth in claim 21 further comprising the step of introducing a second decal to the surface of the mold after the step of removing the backing paper layer from the surface of the mold, wherein the second decal includes a backing paper layer disposed adjacent the surface of the mold and a decal layer overlaying the backing paper layer.

23. The method as set forth in claim 14 further comprising the step of removing the backing paper from the surface of the mold after the step of demolding the composite article from the mold.

24. The method as set forth in claim 23 further comprising the step of introducing a second decal to the surface of the mold after the step of removing the backing paper layer from the surface of the mold, wherein the second decal includes a backing paper layer disposed adjacent the surface of the mold and a decal layer overlaying the backing paper layer.

25. The method as set forth in claim 1 wherein the paint composition is selected from the group of polyurethane-based paint compositions, acrylic-based paint compositions, polyester-based paint compositions, and combinations thereof.

26. A method of forming a composite article in a mold including a surface defining a mold cavity, said method comprising the steps of:

introducing a decal to the surface of the mold, the decal including a backing paper layer disposed adjacent the surface of the mold and a decal layer overlaying the backing paper layer with the decal layer having an inner surface opposite the surface of the mold;

applying a polyurethane elastomer composition into the mold cavity and over the mold surface and the inner surface of the decal layer to form an elastomeric layer having an outer surface and an inner surface, with the inner surface of the elastomeric layer opposite the surface of the mold, and at least a portion of the outer surface of the elastomeric layer bonded to the inner surface of the decal layer; and demolding the composite article from the mold;

wherein the decal layer has a thickness less than or equal to a thickness of the elastomeric layer.

27. The method as set forth in claim 1 wherein the decal further includes an ink layer disposed adjacent a side of the decal layer.

28. The method as set forth in claim 27 wherein the decal layer is formed from a polyurethane composition.

29. The method as set forth in claim 27 wherein the decal layer is formed from a lacquer composition.

30. The method as set forth in claim 26 wherein the decal layer is formed from a coating composition.

31. The method as set forth in claim 30 wherein the coating composition is selected from the group of ink compositions, lacquer compositions, paint compositions, and combinations thereof.

32. The method as set forth in claim 26 wherein the decal further includes an ink layer disposed adjacent a side of the decal layer.

33. The method as set forth in claim 32 wherein the decal layer is formed from a polyurethane composition.

34. The method as set forth in claim 32 wherein the decal layer is formed from a lacquer composition.

35. The method as set forth in claim 1 wherein the decal layer is further defined as a sheet.

36. The method as set forth in claim 35 wherein the sheet has a thickness less than the combined thickness of the paint and elastomeric backing layers.

37. The method as set forth in claim 1 wherein the composite article is further defined as a part for a vehicle.

38. The method as set forth in claim 1 wherein the composite article is further defined as a seat.

39. The method as set forth in claim 1 wherein the decal layer is free of a heat and/or a solvent-activatable adhesive.

40. The method as set forth in claim 5 wherein the mold is heated to a temperature of from about 140° F. to about 170° F.

41. The method as set forth in claim 1 wherein the decal layer is in direct contact with the paint layer and the paint layer is in direct contact with the elastomeric layer.

42. The method as set forth in claim 2 wherein the foam backing layer is in direct contact with the elastomeric layer.

43. A method of forming a seat and/or vehicle part in a mold including a surface defining a mold cavity, said method comprising the steps of:

introducing a decal to the surface of the mold, the decal including a backing paper layer disposed adjacent the surface of the mold and a decal layer overlaying the backing paper layer, with the decal layer further defined as a sheet, and the decal layer having an inner surface opposite the surface of the mold;

applying a paint composition into the mold cavity and over the mold surface and the inner surface of the decal layer to form a paint layer having an outer surface and an inner surface, with the inner surface of the paint layer opposite the surface of the mold, and at least a portion of the outer surface of the paint layer bonded to the inner surface of the decal layer;

applying a polyurethane elastomer composition into the mold cavity and over the inner surface of the paint layer to form an elastomeric backing layer bonded to the inner surface of the paint layer, and the elastomeric backing layer having an inner surface opposite the surface of the mold;

applying a polyurethane foam composition into the mold cavity and over the inner surface of the elastomeric backing layer to form a foam backing layer bonded to the inner surface of the elastomeric backing layer; and demolding the seat and/or vehicle part from the mold;

wherein the decal layer has a thickness less than a combined thickness of the paint and elastomeric backing layers.

44. The method as set forth in claim 43 wherein the decal layer is free of a heat and/or a solvent-activatable adhesive.

* * * * *